United States Patent
Bolin

[11] Patent Number: 5,884,941
[45] Date of Patent: Mar. 23, 1999

[54] MUD FLAP EXTENDER

[76] Inventor: Louis R. Bolin, 8005 Elizabeth La., Mandeville, La. 70448

[21] Appl. No.: 826,021

[22] Filed: Mar. 28, 1997

Related U.S. Application Data

[60] Provisional application No. 60/014,973, Apr. 8, 1996.
[51] Int. Cl.$^6$ .................................................. B62D 25/16
[52] U.S. Cl. ........................ 280/851; 280/154; 280/848; 280/849; 280/855; 280/856; 280/296
[58] Field of Search ................................ 280/154, 296, 280/848, 849, 851, 855, 856

[56] References Cited

U.S. PATENT DOCUMENTS

| | | | |
|---|---|---|---|
| 3,006,658 | 10/1961 | Wenham et al. | 280/154 |
| 3,560,021 | 2/1971 | Watson . | |
| 3,580,604 | 5/1971 | Overend . | |
| 3,640,577 | 2/1972 | Ducote . | |
| 3,713,669 | 1/1973 | Evans . | |
| 3,721,459 | 3/1973 | Lea | 280/154 |
| 3,784,226 | 1/1974 | Wilfert et al. | 280/154 |
| 3,913,948 | 10/1975 | Gee et al. | 280/154 |
| 4,012,053 | 3/1977 | Bode . | |
| 4,043,568 | 8/1977 | Hollon . | |
| 4,268,053 | 5/1981 | Toppins et al. | 280/154 |
| 4,541,646 | 9/1985 | Knowley . | |
| 4,928,994 | 5/1990 | Buchner . | |
| 4,966,378 | 10/1990 | Cook . | |
| 5,026,094 | 6/1991 | Haddox . | |
| 5,044,667 | 9/1991 | Manning . | |
| 5,267,752 | 12/1993 | Miller | 280/848 |
| 5,326,135 | 7/1994 | Nakayama et al. | 280/851 |
| 5,676,389 | 10/1997 | Richardson | 280/851 |

FOREIGN PATENT DOCUMENTS 1545104  11/1968  France .

*Primary Examiner*—Charles T. Jordan
*Assistant Examiner*—Charles R. Ducker, Jr.
*Attorney, Agent, or Firm*—John M. Harrison

[57] ABSTRACT

A mud flap extender for mounting on the rear quarter panel behind each rear wheel or wheels of a truck or other vehicle and suspending a mud flap a sufficient distance rearwardly of the wheel(s) to prevent the wheel(s) from engaging the mud flap and tearing the mud flap from the vehicle frame when the vehicle is operated in reverse. Each mud flap extender is characterized by a fender module that matches the curvature of the vehicle rear quarter panel and typically mounts on the wheel well plate of the rear quarter panel and an angle-iron mount plate having a top flange for engaging the fender module and a bottom flange for mounting a mud flap which is suspended downwardly from the fender module in spaced relationship with respect to the rear wheel or wheels of the vehicle.

11 Claims, 1 Drawing Sheet

MUD FLAP EXTENDER

CROSS-REFERENCE TO RELATED APPLICATIONS

This application is a continuation of U.S. Provisional Patent Application No. 60/014,973, filed Apr. 8, 1996, now abandoned.

BACKGROUND OF THE INVENTION

1. Field of the Invention

This invention relates to mud flaps for preventing the rear wheels of a truck or other vehicle from throwing rocks, mud or other debris rearwardly of a travelling vehicle and more particularly, to a mud flap extender for mounting on each rear frame or rear quarter panel wheel well plate of a vehicle and extending the mud flap several inches rearwardly with respect to the conventional mounting location of the mud flap. In a preferred embodiment of the invention each of two mud flap extenders is characterized by a fender module that matches the curvature of the vehicle rear quarter panel and mounts on the rear quarter panel wheel well plate and an angle-iron mount plate having a top flange for engaging and mounting on the bottom of the fender module and a bottom flange for mounting a mud flap on the fender module. The fender module is mounted in a horizontal orientation behind a rear wheel or wheels of the vehicle, with the fender module preferably bolted to the rear quarter panel wheel well plate. A rubber mud flap is typically bolted to and suspended downwardly from the rear flange of the mount plate.

Conventionally, mud flaps are fixed to a vehicle frame or fender and located a few inches rearwardly of the rear wheels of the vehicle to protect the rear quarter panels of the vehicle, as well as following vehicles, from being damaged by debris such as rocks and mud thrown rearwardly by the wheels. Because each mud flap is normally positioned in close proximity to the corresponding rear wheel, the mud flaps can be easily pinched between an object protruding from the ground, such as a curb, or even the flat road surface itself, and the tire of the vehicle and subsequently torn from the vehicle as the vehicle is operated in reverse. If the mud flaps are suspended from a conventional bar or frame hanger spaced from the wheels, then mud, rocks and other debris are easily thrown upwardly by the rear wheels against the vehicle fenders and quarter panels. The mud flap extenders of this invention each extend a mud flap farther rearwardly with respect to the rear wheel than is possible using conventional mud flap mounting techniques, such that the mud flaps cannot be pinched between the vehicle rear wheel and the road surface or other object protruding from the road surface when the vehicle is operated in reverse. Furthermore, the mount plate and mud flap elements of the mud flap extenders are designed and located to prevent contact between the road debris thrown upwardly by the vehicle rear tires and the quarter panels or rear fenders of the vehicle. The mud flap extenders are shaped into aesthetically pleasing configurations which are custom designed for various vehicles, as desired.

2. Description of the Prior Art

Many protective devices are known in the art for preventing rocks, mud and other debris from being thrown rearwardly by the rear wheels of a vehicle into the path of oncoming vehicles. U.S. Pat. No. 3,560,021, dated Feb. 2, 1971, to William W. Watson, describes "Mudguards", characterized by a pair of spaced, semicircular plates, including a radially-formed portion spanning the plates. The mud guards are pivotally and adjustably mounted on the rear axle of the vehicle to rotate about the axis of the wheel which it acts to protect. U.S. Pat. No. 3,580,604, dated May 25, 1971, to Thomas F. Overend, discloses "Mud Flaps For Dump Trucks", characterized by a stationary upper flap and an upwardly-retractable lower flap suspended on cantilever mounts behind each rear wheel of a dump truck. The upper flap mount is supported directly by the truck frame and the lower flap mount is mounted on an upwardly-swingable arm pivoted to the truck frame in front of the flaps. U.S. Pat. No. 3,640,577, dated Feb. 8, 1972, to Nolan J. Ducote, details "Retractable Mud Flaps For Dump Trucks and Trailers". The mud flaps are operated by springs under the control of a mechanism which is locked when the bed of the dump truck upon which the mud flaps are mounted is in normal position, and is unlocked when the bed is slightly tilted prior to complete tilting for dumping. When the mechanism is locked, it applies tension to the springs, which pull the flaps into normal position. When the mechanism is unlocked, the tension is removed and the springs force the flaps out and away from the load. U.S. Pat. No. 4,012,053, dated Mar. 15, 1977, to Robert G. Bode, describes a "Splash Guard" for mounting on the fender of a vehicle, including a corrosion-resistant, metal body portion having a permanent, continuous, protective border formed of a plastic material which is intimately bonded to both sides of the body portion along its entire periphery, such that the normally thin, sharp edges of the body portion are completely covered. U.S. Pat. No. 4,541,646, dated Sep. 17, 1985, to David W. Knowley, discloses a "Mud Flap Hanger" for use on road vehicles such as trucks and truck-tractors, which hanger is characterized by a pair of rods, each of which is pivotally attached to opposite sides of the central frame member of the truck and suspends a rectangular rubber mud flap downwardly therefrom. The mud flaps may be moved from behind the wheel of the truck and stowed centrally between the rear wheels. Pivotal movement of the supporting rods is effected by use of a flexible bushing which is generally rectangular in shape and in which the inner walls of a generally square aperture has expansion slots and lubrication grooves for lubricating the arms carried within the aperture. U.S. Pat. No. 5,026,094, dated Jun. 25, 1991, to John Haddox, details an "Adjustable Mud Flap Assembly" which utilizes the transverse bar member of a trailer hitch assembly as the main support for the mud flaps. The mud flap assembly has a pair of L-shaped mud flap frame members, each removably attached to the corresponding end of the transverse bar member. Each frame member includes a rectangular mud flap removably attached thereto. By varying the radial disposition of the frame member with respect to the transverse bar member, the position of the mud flap with respect to the vehicle can be changed. U.S. Pat. No. 5,044,667, dated Sep. 3, 1991, to Kenneth G. Manning, describes a "Pull-Away Mud Flap" which can be easily installed and removed from a mounting bracket characterized by a bracket body, from which two flanges extend downwardly and converge toward one another at their lower ends to form a slot therebetween. The mounting bracket is mounted on the frame, behind the rear wheel of the vehicle and the mud flap is extended from the mounting bracket by engaging the peripheral edge of the mud flap with the slot of the mounting bracket.

It is an object of this invention to provide a mud flap extender for mounting on the rear fender, rear body panel, quarter panel, or the frame of a vehicle behind the rear wheels of the vehicle and suspending a mud flap in rearwardly-spaced, protective relationship with respect to each rear wheel.

Another object of this invention is to provide a pair of mud flap extenders, each characterized by a pair of fender modules customized for mounting on the rear body panels, respectively, of the vehicle and matching the rear body or quarter panel curvature and a mount plate, including a top flange extending horizontally and a bottom flange extending vertically from the rear edge of the front flange of the mount plate, which top flange is mounted on the bottom of the fender module of the vehicle. Each mount plate is adapted for suspending a mud flap downwardly from the bottom flange and spaced from the rear wheel or wheels to prevent the mud flap from being caught between the rear wheel or wheels and the curb, pavement or road surface and torn from the vehicle when the vehicle is operated in reverse and to prevent road debris thrown upwardly from the rear wheels from striking the vehicle rear body or quarter panels and/or fenders.

SUMMARY OF THE INVENTION

These and other objects of the invention are provided in a mud flap extender for mounting on each rear body or quarter panel of a vehicle and suspending a mud flap of selected size in rearwardly-spaced relationship with respect to the rear wheel of the vehicle, to prevent the mud flap from being caught between the wheel and the curb, pavement or road surface and being torn from the vehicle when the vehicle is driven in reverse and to divert road debris from the rear tires downwardly. Each of the mud flap extenders includes a plastic fender module having a module face molded to match the contour of the rear body panels of the vehicle and a flat bottom, as well as an L-shaped angle-iron mount plate having a top flange shaped to horizontally mount on the flat bottom of each fender module, respectively, and a bottom flange extending substantially perpendicularly downwardly from the front flange. The bottom flange is adapted for attachment to a mud flap to secure the mud flap on the fender module behind a corresponding rear wheel or wheels in a protective, downwardly-deployed configuration.

BRIEF DESCRIPTION OF THE DRAWINGS

The invention will be better understood by reference to the accompanying drawing, wherein.

DESCRIPTION OF THE PREFERRED EMBODIMENTS

Figure 1:
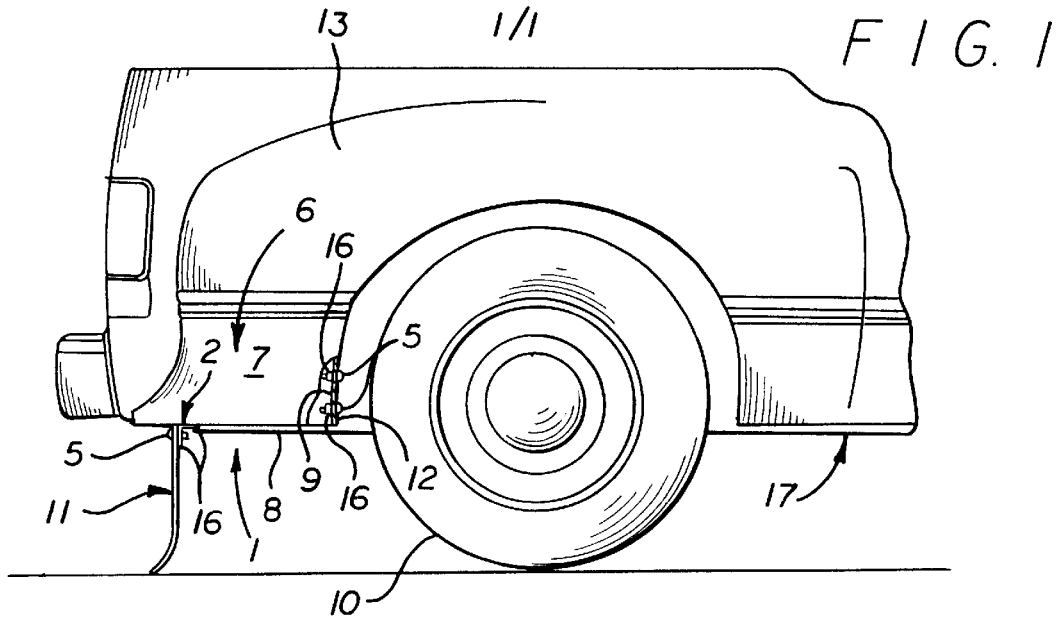
FIG. 1 is a side view of a preferred embodiment of the mud flap extender of this invention, mounted on the rear body or quarter panel of a vehicle.
Figure 2:
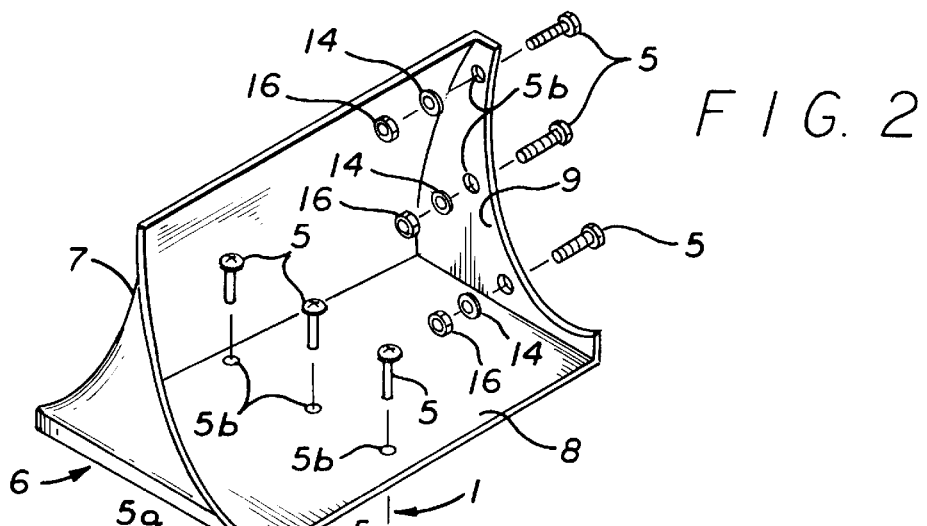
FIG. 2 is an exploded, perspective view of the mud flap extender illustrated in FIG. 1, more particularly detailing a preferred technique for mounting a mud flap on the fender module of the mud flap extender.
Figure 3:
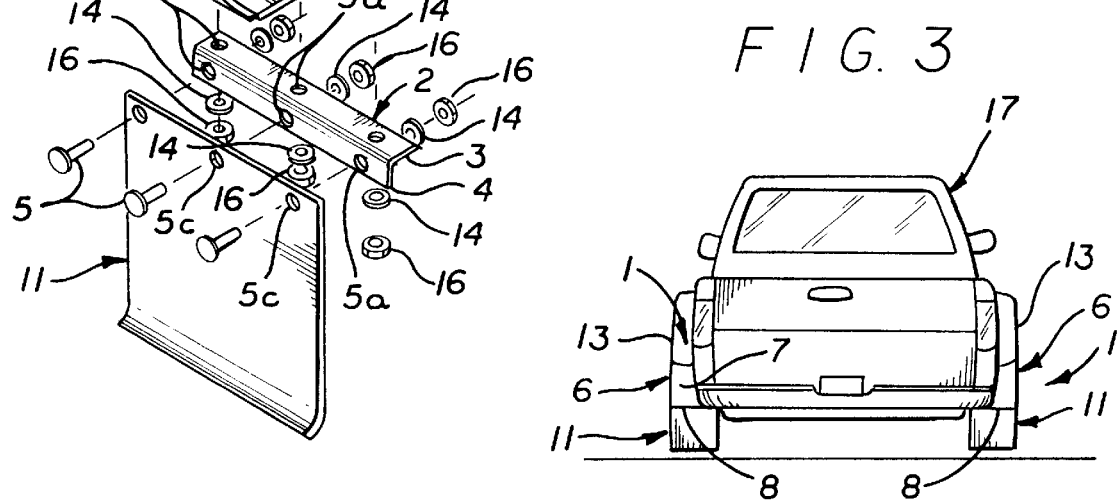
FIG. 3 is a rear view of the mud flap extenders mounted on a vehicle, more particularly illustrating positioning of the fender modules on the quarter panels of the vehicle.

Referring to FIGS. 1–3 of the drawing, in a preferred embodiment the mud flap extenders of this invention are generally illustrated by reference numeral 1. Each mud flap extender 1 is characterized by a fender module 6 having a module face 7 which is shaped or contoured to match the contour of the rear body or quarter panel 13 of a vehicle 17 and an L-shaped flap mount plate 2, illustrated in FIG. 2, constructed of a rigid material such as aluminum, steel (angle-iron), fiberglass or plastic, in nonexclusive particular.

The flap mount plate 2 of the mud flap extender 1 includes a top plate flange 3, defining a horizontally-positioned face for bolting onto the flat module bottom 8 of the mud flap extender 1 and a bottom plate flange 4, extending substantially perpendicularly downwardly from the top plate flange 3 of the flap mount plate 2. The top plate flange 3 is mounted on the flat module bottom 8 of the fender module 6 by the respective bolts 5, each of which extends through a corresponding and aligned plate bolt opening 5a in the top plate flange 3 and corresponding module bolt openings 5b in the module bottom 8, positioned rearwardly of a rear wheel 10 of the vehicle 17. The fender modules 6 are hollow to facilitate access to the module bottom 8 for mounting of the respective flap mount plates 2 on the corresponding module bottom 8 and the fender modules 6 on the respective wheel well plates 12 of the corresponding rear quarter panels 13, as hereinafter further described. Each bolt 5 receives a washer 14 and a nut 16 is threaded on the bolt 5 to removably secure the flap mount plate 2 of each mud flap extender 1 on a corresponding bottom module 8. The bottom plate flange 4 is similarly provided with multiple, spaced plate bolt openings 5a for receiving additional bolts 5, each of which extends through a corresponding and aligned flap bolt opening 5c in a mud flap 11 and through the corresponding bolt opening 5a. Each bolt 5 receives a washer 14 and a nut 16 is threaded on the bolt 5 to secure the mud flap 11 on the bottom plate flange 4 in a vertically downwardly-suspended orientation, as illustrated in FIGS. 1 and 3.

As further illustrated in FIGS. 1–3, each of the fender modules 6 are configured to define a contoured module face 7 that matches the curvature and configuration of the respective rear quarter panels 13 of the vehicle 17 and extends to the flat module bottom 8 and to a flat module mount panel 9 that seats against the wheel well plate 12 of the vehicle 17, as illustrated in FIG. 1. Both the module bottom 8 and the module mount panel 9 are accessible from the hollow interior of each fender module 6 as heretofore described and as illustrated in FIG. 2. Accordingly, each fender module 6 can be bolted to a corresponding wheel well plate 12 by means of bolts 5, which extend through spaced module bolt openings 5b in the module mount panel 9, and through corresponding openings (not illustrated) in the wheel well plates 12, as further illustrated in FIGS. 1 and 2.

It will be appreciated by those skilled in the art that the mud flap extenders of this invention operate to more efficiently deploy a pair of mud flaps in a safe, yet fully functional configuration on the rear of a truck or other vehicle of any style and model. This deployment facilitates use of mud flaps which may touch the pavement or road surface, as illustrated in FIGS. 1 and 3 of the drawing, to better protect following vehicles from flying debris and provide an aesthetically-pleasing mud flap orientation and configuration, without fear of damaging or inadvertently removing the mud flaps when the vehicle is operated in reverse.

Referring again to the drawing, while each flap mount plate 2 is illustrated in mounted configuration to a corresponding fender module 6 and mud flap 11 by means of the corresponding top plate flange 3, bottom plate flange 4 and bolts 5, respectively, it will be appreciated that the flap mount plate 2 may be alternatively shaped and equally so mounted by means of alternative fasteners, as desired. Furthermore, each fender module 6 of the mud flap extender 1 can be shaped and contoured in an aesthetically-pleasing manner to receive a mud flap 11 of any desired size and shape and fit any desired vehicle and can be constructed of a single piece of material such as aluminum, fiberglass or plastic, and ABS plastic as a preferred material, in non-exclusive particular.

Accordingly, while the preferred embodiments of the invention have been described above, it will be recognized and understood that various other modifications may be made in the invention and the appended claims are intended to cover all such modifications which may fall within the spirit and scope of the invention.

Having described my invention with the particularity set forth above, what is claimed is:

1. A mud flap extender for deploying a mud flap in spaced relationship with respect to the rear quarter panels and rear wheels, respectively, of a vehicle, said mud flap extender comprising a shaped module having an outer surface contoured substantially to conform to the shape of the rear quarter panels rearwardly of the rear wheels, respectively; a substantially flat bottom surface extending from said outer surface; and flange means provided on said bottom surface for receiving and suspending the mud flaps in said spaced relationship with respect to the rear wheels.

2. The mud flap extender of claim 1 wherein said flange means comprises a top flange carried by said flat bottom surface and a bottom flange extending from said top flange, said bottom flange attached to the mud flap.

3. A mud flap extender for mounting on a vehicle having wheels and wheel well plates and rear quarter panels and suspending mud flaps rearwardly of, and spaced from the wheels to prevent the wheels from running over the mud flaps and tearing the mud flaps from the vehicle when the vehicle is operated in reverse, said mud flap extender comprising a pair of fender modules positioned behind the wheels, respectively, said fender modules mounted on the wheel well plates, respectively, and contoured to the shape of the rear quarter panels, respectively, and comprising flange means provided on said fender modules for securing the mud flaps on said fender modules.

4. The mud flap extender of claim 3 wherein said fender modules each comprises a shaped module face contoured to substantially match the shape of the rear quarter panels and a substantially flat bottom surface extending from said module face for supporting said flange means and the mud flaps, respectively.

5. The mud flap extender of claim 3 comprising bolt openings provided in said flange means and said fender modules, respectively, and bolts for extending through said bolt openings and removably securing said flange means to said fender modules.

6. The mud flap extender of claim 3 wherein said fender modules each comprises a shaped module face contoured to substantially match the shape of the rear quarter panels and a substantially flat bottom surface extending from said module face for supporting said flange means and the mud flaps, respectively, and comprising bolt openings provided in said flange means and said flat bottom surface, respectively, and bolts for extending through said bolt openings and removably securing said flange means to said flat bottom surface of said mud flap extender.

7. The mud flap extender of claim 3 wherein said fender modules each comprises a shaped module face contoured to substantially match the shape of the rear quarter panels and a substantially flat bottom surface extending from said module face and wherein said flange means comprises a top plate flange extending from said bottom surface and a bottom plate flange extending from said top plate flange for supporting the mud flaps and comprising bolt openings provided in said top plate flange, said bottom plate flange, the mud flaps and said flat bottom surface, respectively, and bolts for extending through said bolt openings and removably securing said top plate flange to said flat bottom surface and the mud flaps to said bottom plate flange, respectively.

8. A mud flap extender for mounting on a vehicle having wheels and wheel well plates and rear quarter panels and suspending a mud flap rearwardly of, and spaced from each of the wheels to prevent the wheels from running over the mud flap and tearing the mud flap from the vehicle when the vehicle is operated in reverse, said mud flap extender comprising a hollow fender module positioned behind each of the wheels, a module mount panel provided in said fender module for engaging the wheel well plates, respectively and mounting said fender module on the wheel mount plates, respectively, a mount plate disposed beneath said fender module, said mount plate having a top plate flange for securing said mount plate on said fender module, respectively, such that said top plate flange is maintained in substantially horizontal position and a bottom plate flange extending from said mount plate in spaced relationship with respect to said top plate flange for engaging and suspending the mud flap from said mount plate.

9. The mud flap extender of claim 8 wherein said fender module further comprises a shaped module face extending to said module mount panel and contoured to substantially match the shape of the rear quarter panels and a substantially flat bottom surface extending from said module face for supporting said top plate flange and the mud flap.

10. The mud flap extender of claim 8 comprising bolt openings provided in said top plate flange, said bottom plate flange, the mud flap and said fender module respectively, and bolts for extending through said bolt openings and removably securing said top plate flange to said fender module and the mud flap to said bottom plate flange.

11. The mud flap extender of claim 8 wherein said fender module further comprises a shaped module face extending to said module mount panel and contoured to substantially match the shape of the rear quarter panels and a substantially flat bottom surface extending from said module face for supporting said top plate flange and the mud flap and comprising bolt openings provided in said top plate flange, said bottom plate flange, the mud flap and said bottom surface, respectively, and bolts for extending through said bolt openings and removably securing said top plate flange to said bottom surface and the mud flap to said bottom plate flange.

\* \* \* \* \*